May 6, 1947.   J. McCOLLUM   2,420,001
CARGO MOVING DEVICE
Filed Dec. 29, 1945
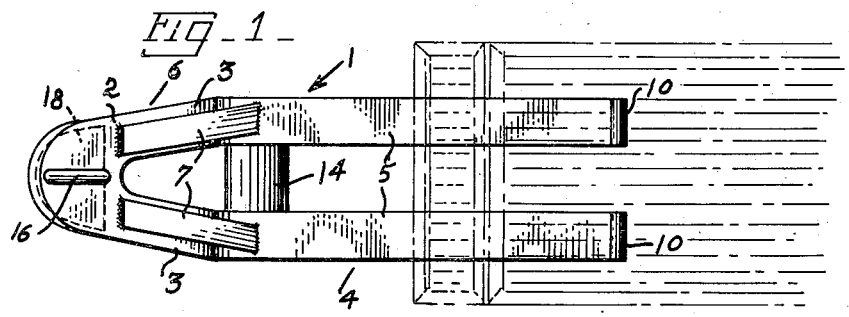
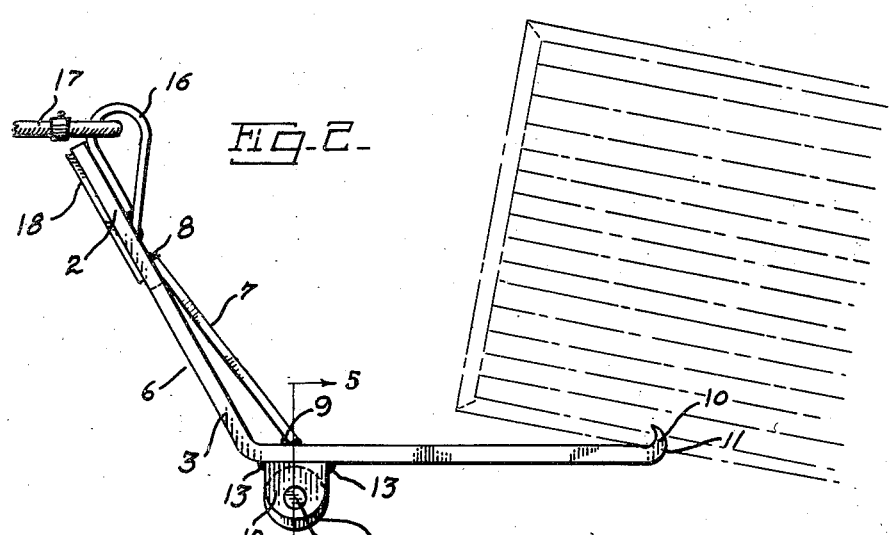
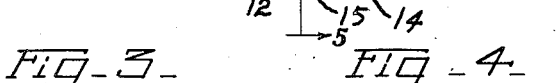
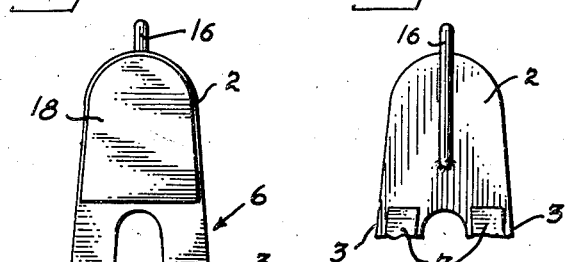
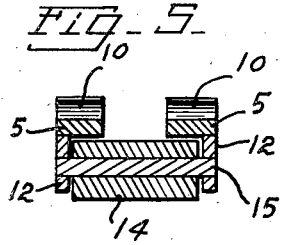
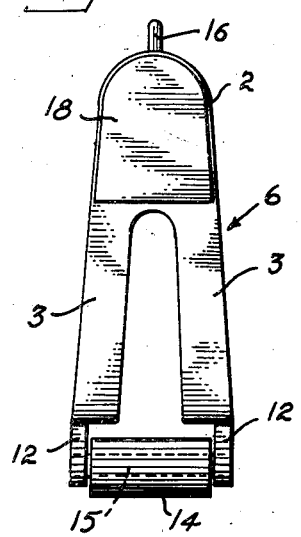
Inventor
JOHN McCOLLUM
By Clarence A. O'Brien
and Harvey B. Jacobson
Attorneys Patented May 6, 1947

2,420,001

UNITED STATES PATENT OFFICE 2,420,001

CARGO MOVING DEVICE

John McCollum, Oakland, Calif.

Application December 29, 1945, Serial No. 638,091

1 Claim. (Cl. 280—78)

This invention relates to a cargo moving device and is particularly adapted for use in moving heavy crates into or from a van or truck. Such trucks are open at the rear and the heavily loaded crates are shifted through the rear door into or out of the vehicle. In order to move a heavy crate out of a van or truck, it must be raised from the floor and then shifted longitudinally, and it is therefore one object of the invention to provide a device which may be thrust into place under a crate which has had one end raised a few inches and pull then exerted upon the device to draw the cargo moving device and its load forwardly.

Another object of the invention is to provide a cargo moving device which is of such formation that after it has been thrust into place under a heavy crate and forward pull is exerted, a roller mounted under the forward end of the load-engaging portion of the device will act as a fulcrum and thus cause its rear end to be raised and the load lifted to such a position that the crate may be drawn forwardly without its front end catching against a floor of a truck or other obstruction which would interfere with forward movement of the crate.

Another object of the invention is to provide the cargo moving device with hooks at the rear end of its load-engaging portion which will bite into the bottom of the crate and thus firmly grip the crate so that it will be drawn forwardly with the cargo moving device.

Another object of the invention is to so form the upwardly extending forward portion of the cargo moving device that it will be braced and prevented from being bent forwardly out of its proper position when pull is exerted to draw the cargo moving device and its load forwardly.

Another object of the invention is to provide a device of this character which is of substantially a unitary construction and will be very strong and capable of withstanding rough usage.

The invention is illustrated in the accompanying drawings, wherein:

Figure 1 is a top plan view of the improved cargo-moving device,

Figure 2 is a side elevation showing the improved cargo-moving device in operative engagement with a load, Figure 3 is a front elevation of the cargo-moving device, Figure 4 is a view looking at the rear face of the upper portion of the upwardly extending member at the front end of the cargo-moving device, and Figure 5 is a transverse sectional view taken along the line 5—5 of Figure 2.

This improved cargo-moving device is formed of steel or other strong metal and has a body which is substantially U-shaped when viewed in top plan as shown in Figure 1. The body, which is indicated in general by the numeral 1, has a bridge 2 from which extend arms 3 and these arms are bent in spaced relation to the bridge to provide a substantially horizontally extending load supporting portion 4 having spaced side bars 5 and a forward portion 6 which extends upwardly at a forward incline from the side bars of the load-supporting portion 4. Bracing bars 7 extend longitudinally of the upstanding forward portion 6 and these bracing bars have their upper ends welded at the base of the bridge 2, as shown at 8, and their lower ends welded to the side bars 5 of the load-engaging portion adjacent, but in rearwardly spaced relation to their front ends. Therefore, the bracing bars 7 will serve very effectively to prevent the upstanding forward portion or member 6 from bending at its junction with the horizontally extending load-supporting portion when pull is exerted to draw the unloading device and its load forwardly. Rear ends of the bars 5 of the load-supporting portion are bent upwardly to form hooks 10 having sharpened upper edges so that when the device is in use and a load resting upon it, the hooks may bite into the bottom of a crate and cause the crate to be drawn forwardly with the cargo moving device. This is clearly shown in Figure 2, and from an inspection of this figure, it will be seen that the heavier the load is, the more positive the gripping engagement of the hooks with the load will be. It should also be noted that the rear surfaces 11 of the hooks are curved, thus permitting rear ends of the bars 5 to be easily forced under a crate to be moved. Bearing brackets 12 which may be formed integral with the bars 5 or welded thereto, as shown at 13, extend downwardly from outer side edges of forward portions of the bars 5 and between these brackets is disposed a roller 14 extending transversely of the cargo-moving device and rotatably mounted by a shaft or axle 15 having its ends engaged through the bearing brackets. The roller not only serves its function as a roller to permit the cargo-moving device to be moved easily with its load, but it also serves as a fulcrum about which the cargo-moving device may tilt and swing the rear end of its load-engaging portion upwardly and raise the load to the position shown in Figure 2 when pull is exerted upon the upstanding forward portion 6. During use of this forward portion as a lever to tilt the cargo-moving device about its fulcrum, the bars 7 serve very effectively to prevent bending at the junction of the lower end of the forward portion or lever 6 with the side bars 5 of the load-engaging portion. A loop 16 for engagement by a tow line 17 is mounted upon the bridge 2 midway the width thereof, and this loop is formed from a thick bar or rod of strong metal which is bent as shown at Figure 2 and welded to the bridge with a portion projecting upwardly above the same. A plate 18 which is welded against the front face of the bridge reinforces it and prevents bending when pull is applied to draw the cargo-moving device forwardly after tilting it to the position shown in Figure 2.

When this device is in use, a wedge or several wedges are driven under the front end of a crate in order to raise the front end of the crate a few inches. The rear end of the cargo-moving device is then engaged under the tilted crate and thrust under the crate, the curved surfaces of the hooks 10 permitting this to be easily done. After the cargo moving device has been thrust into place under the crate, the cable 17 which is wound upon a power drum or may be connected with a tractor is then engaged through the loop 16 and tied or a hook carried by the cable may be engaged through the loop. Pull is then exerted upon the cable and this pull will first swing the forward portion or member 6 forwardly so that it acts as a lever to tilt the rear end of the load-engaging portion upwardly and then draw the cargo-moving device forwardly. During the upward movement of the rear end of the load-engaging portion, the hook 10 will bite into the bottom of the crate to such an extent that slippage will be prevented, and as the cargo-moving device is drawn forwardly by a tractor or by rotation of a power drum upon which the rope or cable 17 is wound, the crate will be drawn forwardly and moved out of a truck or van. After the crate has been moved out of the vehicle, it may be lowered onto rollers, or if it is moved to a desired location by the cargo-moving device and pull upon the cable released, the front end of the crate may be brought to rest upon temporary supporting means such as blocks or wedges and the hooks then freed from the crate and the cargo-moving device drawn forwardly from under the crate. If the crate is to be loaded upon a truck or van, the cable 17 will be brought forwardly through a suitable opening at the front end of the crate and connected with the cargo-moving device so that the crate may be drawn into the van or truck and then removed and the crate shifted to its proper position in the vehicle in any manner desired.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having thus described the invention, what is claimed is:

A cargo-moving device comprising a substantially V-shaped body having a bridge and arms extending therefrom, said body being bent intermediate the length of its arms to provide a horizontally extending load-supporting portion and a forward portion extending upwardly at a forward incline from the front end of the load-supporting portion, rear ends of the arms being bent upwardly and forming load-engaging hooks, bearing brackets extending downwardly from outer side edges of the arms at the front end of the said load-supporting portion, a roller rotatably mounted between said brackets, bracing bars extending longitudinally of the said forward portion with their upper ends secured to upper portions of the arms and their lower portions secured to the arms rearwardly of the lower edge of the said forward portion, a reinforcing plate for the upper end of said forward portion mounted against the front face thereof, and loop for engagement by a towing line mounted vertically against the rear face of the bridge midway the width thereof.

JOHN McCOLLUM.

REFERENCES CITED

The following references are of record in the file of this patent:

FOREIGN PATENTS

| Number | Country | Date |
| --- | --- | --- |
| 795,087 | French | Dec. 26, 1935 |
| 344,245 | German | Nov. 17, 1921 |